(12) United States Patent
Okabe et al.

(10) Patent No.: US 11,527,769 B2
(45) Date of Patent: Dec. 13, 2022

(54) METHOD FOR INSPECTING GAS LEAK FROM FUEL CELL STACK

(71) Applicant: HONDA MOTOR CO., LTD., Tokyo (JP)

(72) Inventors: Yusuke Okabe, Tochigi (JP); Satoshi Hasegawa, Tochigi (JP); Hiroshi Sekiguchi, Tochigi (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/207,754

(22) Filed: Mar. 22, 2021

(65) Prior Publication Data
US 2021/0305603 A1  Sep. 30, 2021

(30) Foreign Application Priority Data
Mar. 26, 2020  (JP) .............................. JP2020-055668

(51) Int. Cl.
*H01M 8/04664* (2016.01)
*G01M 3/22* (2006.01)

(52) U.S. Cl.
CPC ....... *H01M 8/04679* (2013.01); *G01M 3/226* (2013.01)

(58) Field of Classification Search
CPC ... H01M 8/04; H01M 8/04082–04179; H01M 8/04313; H01M 8/0438–04485; H01M 8/04664–04679; H01M 8/2465–2483; G01M 3/00–229
See application file for complete search history.

(56) References Cited

U.S. PATENT DOCUMENTS

| 6,085,576 A | * | 7/2000 | Sunshine | G01N 33/0031 340/634 |
| 2008/0156549 A1 | * | 7/2008 | Leboe | H01M 8/04559 429/82 |
| 2017/0110746 A1 | * | 4/2017 | Mack | H01M 8/04462 |
| 2018/0067013 A1 | * | 3/2018 | Son | G01M 3/20 |

FOREIGN PATENT DOCUMENTS

| DE | 212004000047 U1 | * | 8/2006 | ........ H01M 8/04089 |
| JP | 2006156038 A | | 6/2006 | |
| KR | 20120050278 A | * | 5/2012 | .............. G01M 3/02 |

OTHER PUBLICATIONS

Machine translation of Muller DE 21 2004 000 047 U1. Originally published Aug. 10, 2006. (Year: 2006).*
Machine translation of Cho KR 20120050278. Originally published May 18, 2012. (Year: 2012).*

* cited by examiner

*Primary Examiner* — Jonathan Crepeau
*Assistant Examiner* — Jacob Buchanan
(74) *Attorney, Agent, or Firm* — CKC & Partners Co., LLC

(57) ABSTRACT

To provide a method for inspecting a gas leak from a fuel cell stack, whereby a leak position can be efficiently identified in a short time. A method for inspecting a gas leak from a fuel cell stack includes a jig installation step of installing a division jig that covers an outer surface, on which stacked end faces of the fuel cell stack are exposed, that divides the outer surface into a plurality of regions, and that includes a plurality of inspection spaces on each divided region. The method further includes a first leak inspection step of identifying a leak region, in which the gas leak occurs, with a gas sensor arranged in each of the inspection spaces.

7 Claims, 4 Drawing Sheets

METHOD FOR INSPECTING GAS LEAK FROM FUEL CELL STACK

This application is based on and claims the benefit of priority from Japanese Patent Application No. 2020-055668, filed on 26 Mar. 2020, the content of which is incorporated herein by reference.

BACKGROUND OF THE INVENTION

Field of the Invention

The present invention relates to a method for inspecting a gas leak from a fuel cell stack.

Related Art

A fuel cell has a stack structure in which, for example, tens to hundreds of cells are stacked.

Each cell is configured by sandwiching a membrane electrode assembly (MEA) between a pair of separators, and the MEA is composed of two electrodes of an anode electrode (anode) and a cathode electrode (cathode), and a solid polymer electrolyte membrane sandwiched between these electrodes.

When hydrogen gas as a reaction gas is supplied to the anode electrode of the fuel cell, and air containing oxygen as a reaction gas is supplied to the cathode electrode, electric power is generated by an electrochemical reaction.

Since the fuel cell uses hydrogen, it is necessary to completely prevent hydrogen leaks from the fuel cell stack.

Therefore, a method for effectively detecting hydrogen leaks in the state of a fuel cell stack has been studied.

For example, Patent Document 1 below identifies a leak position by detecting a temperature change during a leak with an infrared sensor.

Patent Document 1: Japanese Unexamined Patent Application, Publication No. 2006-156038

SUMMARY OF THE INVENTION

The temperature change due to a hydrogen leak in a fuel cell stack is very small.

Therefore, in the method of Patent Document 1, it is difficult to identify hydrogen leaks with high accuracy.

Another possible method is to submerge a fuel cell stack in water and identify a leak position based on the position of bubbles.

However, this method may falsely detect a leak due to the detection of air bubbles attached to the fuel cell stack when it is submerged in water. Further, since it requires a process to dry the submerged fuel cell stack, it takes time to identify the leak position. Thus, a method that can identify the leak position in a short time has been required.

In response to the above issues, it is an object of the present invention to provide a method for inspecting a gas leak from a fuel cell stack, whereby a leak position can be accurately identified in a short time.

The present inventors have found that by dividing a fuel cell stack into specific regions, it is possible to efficiently identify a leak position in a short time and completed the present invention. Specifically, the present invention provides the following.

A first aspect of the present invention is an inspection method for identifying a position of a gas leak from a fuel cell stack in which a plurality of fuel cell cells are stacked. The method includes a jig installation step of installing an inspection jig that divides an outer surface, on which stacked end faces of the fuel cell stack are exposed, into a plurality of regions, and that includes a divided inspection portion including a gas leak inspection space on each divided region; and a first leak inspection step of identifying a leak region, in which the gas leak occurs, with a gas sensor arranged in each of the gas leak inspection spaces.

In a second aspect of the present invention according to the first aspect, the divided regions of the outer surface are obtained by dividing the outer surface in a grid pattern or in parallel with a stacking plane.

In a third aspect of the present invention according to the first or second aspect, the method further includes a second leak inspection step of identifying a leak position in the leak region identified in the first leak inspection step.

In a fourth aspect of the present invention according to any one of the first to the third aspects, after the inspection method is performed on a first outer surface of the fuel cell stack, the fuel cell stack is rotated so that a second outer surface comes to a position occupied by the first outer surface prior to rotation, and the inspection method is performed on the second outer surface.

In a fifth aspect of the present invention according to any one of the first to the fourth aspects, the jig installation step includes positioning the inspection jig on the fuel cell stack.

In a sixth aspect of the present invention according to any one of the first to the fifth aspects, in the jig installation step, the inspection jig is fixed to an end plate of the fuel cell stack and positioned.

In a seventh aspect of the present invention according to any one of the first to the sixth aspects, the divided inspection portion is formed in a pyramidal or a hemispherical shape, with a base of the divided inspection portion being coplanar with an outer periphery of the divided region, and the divided inspection portion narrowing in width as it extends from the base.

According to the method for inspecting a gas leak from a fuel cell stack of the present invention, it is possible to identify a leak position in a short time and with high accuracy.

DETAILED DESCRIPTION OF THE INVENTION

First Embodiment

An embodiment of the present invention will be described with reference to the drawings.

Figure 1A:
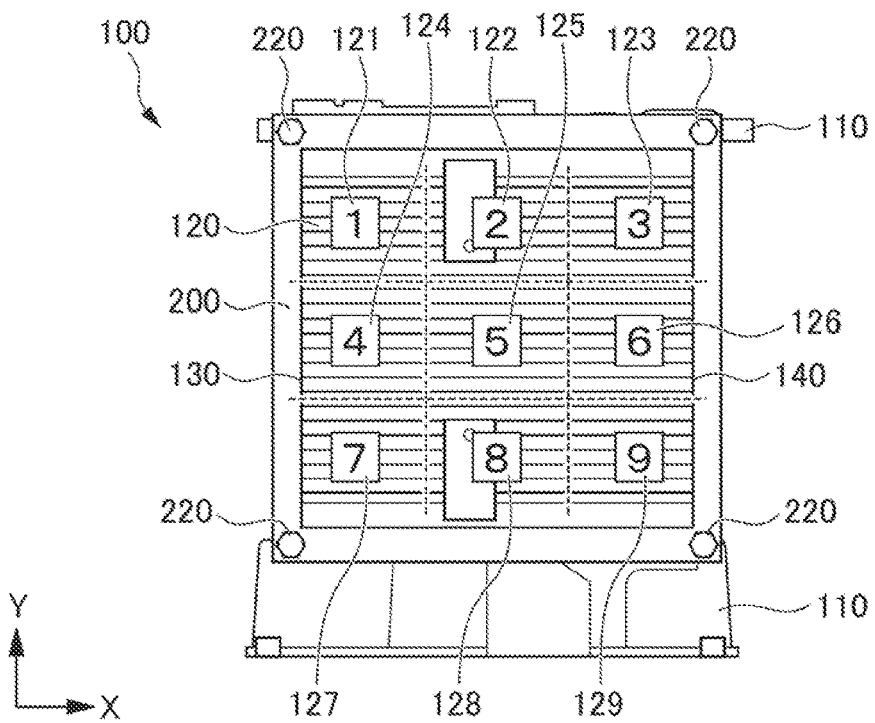
FIG. 1A is a top view illustrating an embodiment of an inspection method of the present invention.
Figure 1B:
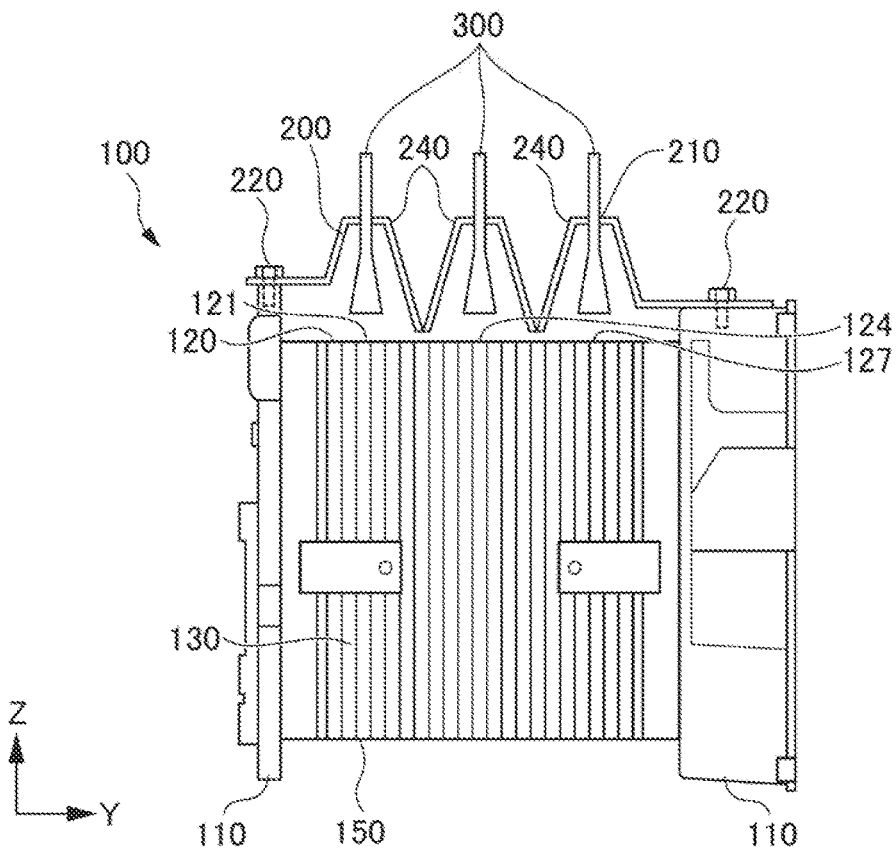
FIG. 1B is a side view illustrating the embodiment of the inspection method of the present invention.

FIGS. 1A and 1B are a top view and a side view illustrating an embodiment of an inspection method of the present invention.

Figure 2:
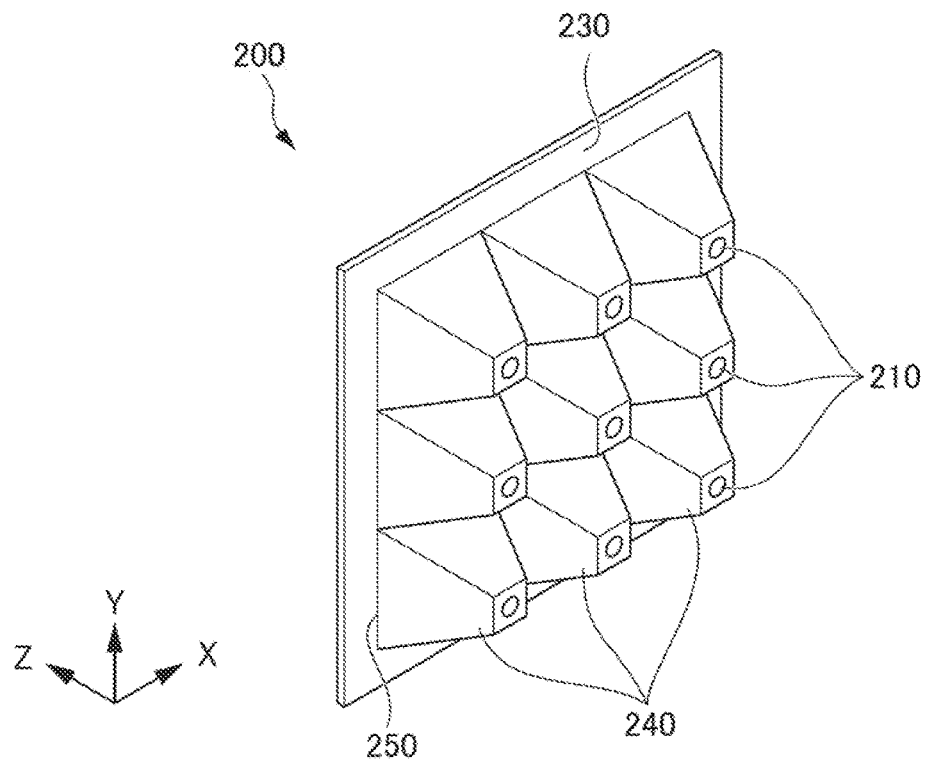
FIG. 2 is a perspective view illustrating an embodiment of an inspection jig employed in the inspection method of the present invention.

FIG. 2 is a perspective view illustrating an embodiment of an inspection jig.

(Fuel Cell Stack)

As shown in FIGS. 1A and 1B, a fuel cell stack 100 in this embodiment has a stack structure in which tens to hundreds of rectangular and planar unit cells are stacked.

Each unit cell is configured by sandwiching a membrane electrode assembly (MFA) between a pair of separators. The MEA includes two electrodes of an anode electrode (anode) and a cathode electrode (cathode), and a solid polymer electrolyte membrane sandwiched between these electrodes.

When hydrogen gas as a reaction gas is supplied to the anode electrode of the fuel cell, and air containing oxygen as a reaction gas is supplied to the cathode electrode, electric power is generated by an electrochemical reaction.

As shown in FIGS. 1A and 1B, the fuel cell stack 100 in this embodiment is configured such that the unit cells are stacked along Y direction (horizontal direction) of FIGS. 1A and 1B (ZX plane is a stacking plane).

Z direction is a vertical direction, and X and Y directions are horizontal directions.

The stacked cells are fixed by a pair of end plates 110, sandwiched between the unit cell of the top layer and the unit cell of the bottom layer.

Thus, the outer surfaces of the fuel cell stack 100 consist of six surfaces: the top and bottom end plates 110 in FIG. 1A, and four outer surfaces on which the stacked end faces of the unit cells are exposed, i.e., a top surface 120, a left side surface 130, a right side surface 140, and a bottom surface 150.

(Inspection Jig)

As shown in FIGS. 1A, 1B, and 2, an inspection jig 200 for performing gas leak inspection is a member covering the entire surface of an outer surface as a whole. In this embodiment, the inspection jig covers the top surface 120 vertically above in a mounted state.

Note that, for convenience of description of divided regions, in FIG. 1A, the detailed configuration of the inspection jig 200 is omitted so that the top surface 120 can be seen though, but in FIGS. 1A and 1B, the inspection jig 200 shown in FIG. 2 actually covers the top surface 120.

As shown in FIG. 2, the inspection jig 200 includes a frame 230, and a plurality of divided inspection portions 240.

As shown in FIGS. 1A and 1B, in the inspection jig 200, the frame 230 straddles the pair of end plates 110, and is positioned at four locations of the four corners of the end plates 110 and fixed with bolts 220.

As a result, positioning accuracy can be maintained.

The inspection jig 200 may be formed of metal, resin, or the like.

As shown in FIGS. 1A, 1B, and 2, in this embodiment, the inspection jig 200 is divided into nine portions of 3×3 in a grid pattern, including nine divided inspection portions 240.

That is, the top surface 120 of the fuel cell stack 100 is substantially equally divided into nine divided regions 121, 122, 123, 124, 125, 126, 127, 128, and 129 (in FIGS. 1A and 1B, for convenience, square 1 (No. 1 region) to square 9 (No. 9 region) are numbered)) by the inspection jig 200.

In the present invention, how a leak position can be identified is determined by the way of this division.

Note that the configuration of the divided inspection portions is not limited to 9 portions of 3×3 in a grid pattern, and 12 portions of 3×4 or 16 portions of 4×4 in a grid pattern may be used.

As shown in FIG. 2, each divided inspection portion 240 on the divided region of the inspection jig 200 is hollow and has a substantially truncated quadrangular pyramid shape, and a hole 210 for inserting and fixing a gas sensor 300 is formed in the top surface thereof.

Each divided inspection portion 240 of the inspection jig is preferably formed in a pyramidal or a hemispherical shape, with the base of each of the divided inspection portions being coplanar with an outer periphery of the divided region, and each of the divided inspection portions narrowing in width as it extends from the base.

Thus, gas tends to gather at the top of an upper part, making it easier for the gas sensor 300 to detect leaked gas.

In this case, it is preferable that the base is in contact with the divided region.

The volume of the inspection space is preferably 5 cc or more and 100 cc or less, preferably 10 cc or more and 50 cc or less.

The volume of the inspection space may be determined based on the desired amount of leaked gas to be identified, and for example, the volume of the inspection space is preferably set so that the desired leak flow rate per minute to be identified is an amount equal to $1/10$ to $1/2$ of the volume of the inspection space.

(Gas Sensor)

The gas sensor 300 is arranged inside the divided inspection portion 240 through the hole 210.

For example, to detect helium gas, a conventionally known He detector or the like can be used.

(Method for Inspecting Gas Leak from Fuel Cell Stack)

A gas leak inspection method of an Example of the present invention will be described with reference to FIGS. 4A, 4B, 5A, and 5B.

(Jig Installation Step)

First, the fuel cell stack 100 to be inspected is prepared.

In this Example, the fuel cell stack 100 in FIGS. 1A, 1B, and 2 is used.

Figure 4A:
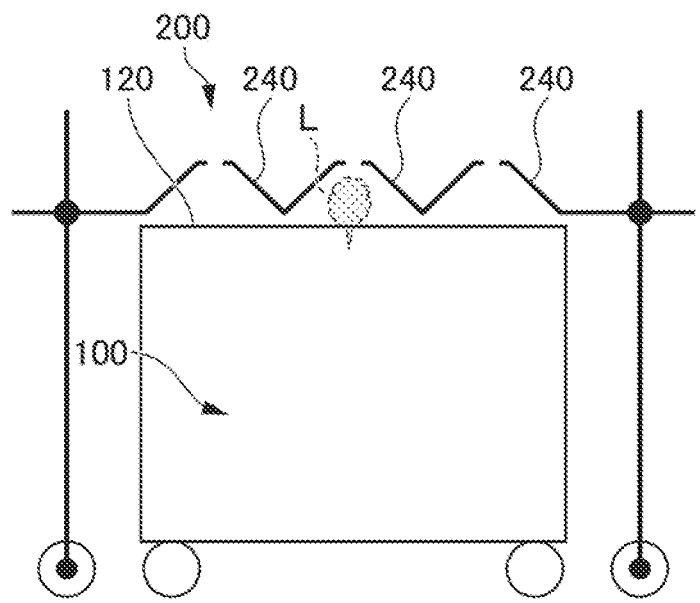
FIG. 4A is a side view illustrating an inspection method in an Example.
Figure 4B:
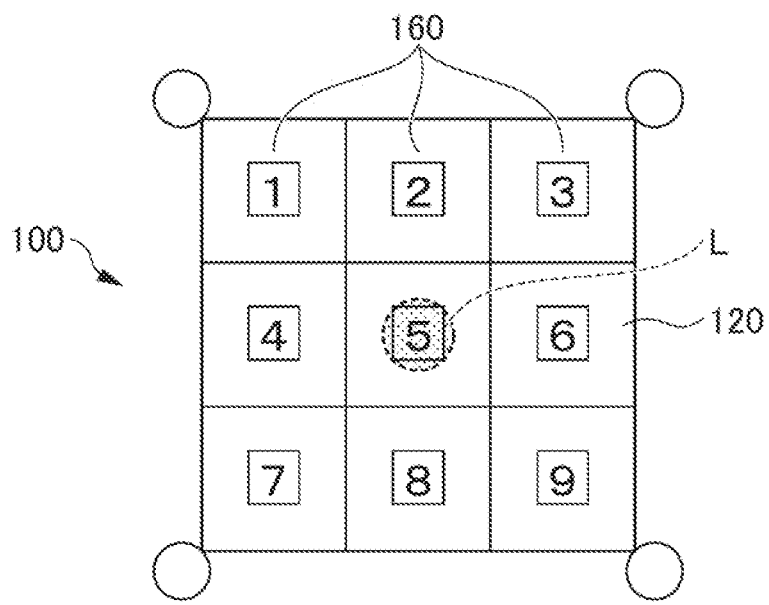
FIG. 4B is top view illustrating the inspection method in the Example.

Next, as shown in FIGS. 4A and 4B, a He detector as the gas sensor 300 is arranged in an upper part in each of the divided inspection portions 240 of the inspection jig 200 divided into nine portions so as to cover the top surface 120.

Thereafter, the inspection jig 200 is positioned by fixing with the pair of end plates 110 and the bolts 220.

In this Example, leak L (indicated by a circle) is present only in No. 5 region, which is at the center, in FIG. 4B.

(First Leak Inspection Step)

Figure 5A:
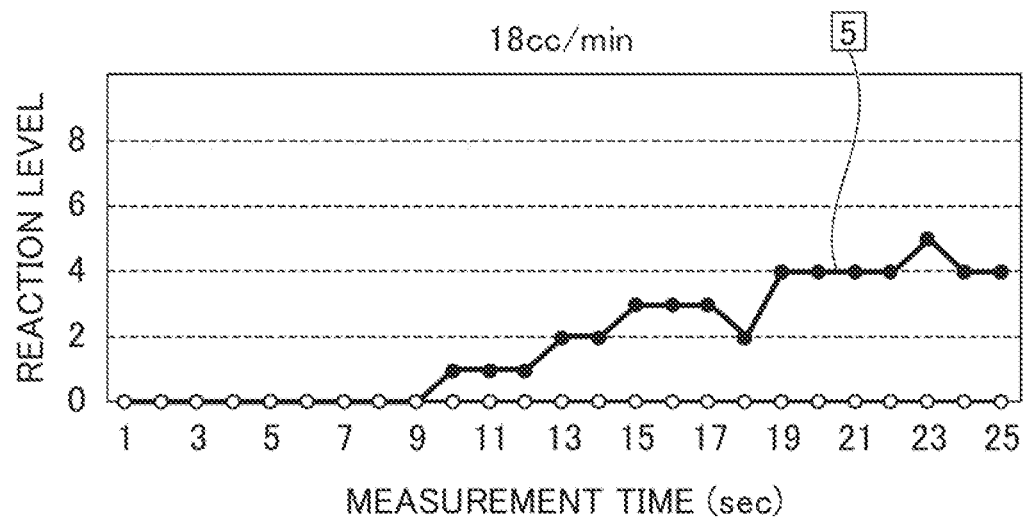
FIG. 5A is a graph illustrating gas leak results in the Example.
Figure 5B:
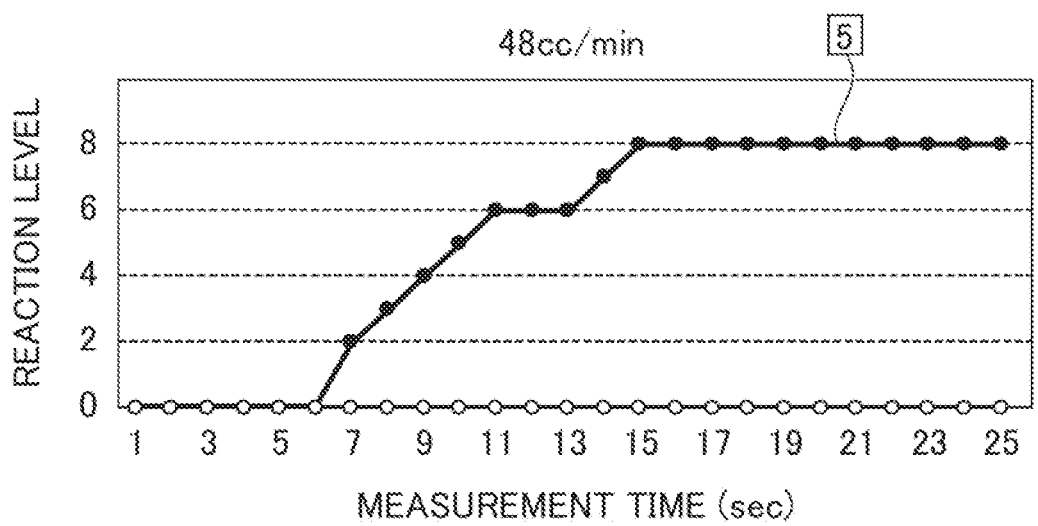
FIG. 5B is a graph illustrating gas leak results in the Example.

In this state, the presence or absence of a leak of helium gas from the unit cells of the fuel cell stack 100 was measured by the respective gas sensors 300, and the results are shown in FIGS. 5A and 5B.

FIG. 5A shows an example in which the amount of helium gas leaking from the leak is 18 cc/min, and FIG. 5B shows an example in which the amount of helium gas leaking from the leak is 48 cc/min.

In the drawings, black circles are the results of the gas sensor of the No. 5 region, and the results of the other eight sensors are indicated by white circles.

In each case, a leak was only detected in the central No. 5 region, and no leaks were detected by the other gas sensors.

From the above, it can be understood that a leak only occurring in the No. 5 region could be detected by this inspection method.

(Second Leak Inspection Step)

In this Example, a leak only occurring in the central No. 5 region was detected, but the specific leak position in the No. 5 region is unknown.

In this case, a second leak inspection step of further identifying the leak position in the leak region identified in the first leak inspection step is performed.

(An Aspect of the Second Leak Inspection Step)

As a specific method of the second leak inspection step that identifies a leak position, for example, a separate He detector or the like may be used to examine the No. 5 region in detail.

After confirming the absence of or identifying the presence and position of a gas leak at a first outer surface of the fuel cell stack by the first leak inspection step and the second leak inspection step, the fuel cell stack may be axially rotated so that a second outer surface comes to the position occupied by the first outer surface prior to rotation, and the gas leak inspection method may be performed on the second outer surface.

This enables the four outer surfaces to be efficiently inspected in a short time.

Second Embodiment

Figure 3:
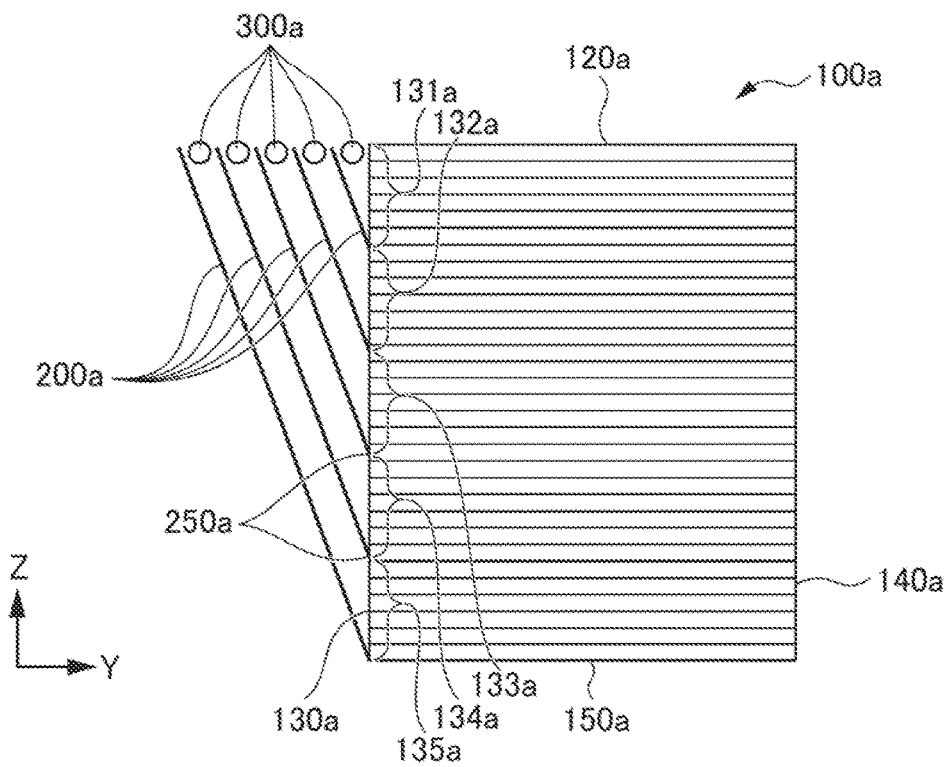
FIG. 3 a schematic side view illustrating another embodiment of the inspection method of the present invention.

FIG. 3 is a schematic side view illustrating another embodiment of the inspection method of the present invention.

In FIG. 3, the unit cells of a fuel cell stack 100a are arranged in a horizontal direction (XY plane), and the stacking direction is Z direction (vertical direction).

An inspection jig 200a differs from that of the embodiment of FIGS. 1A, 1B, and 2 in that the inspection jig 200a covers a side surface 130a of the fuel cell stack 100a.

As described above, in the present invention, not only a top surface but also a side surface can be used as an outer surface of a fuel cell stack that can be inspected.

In FIG. 3, the inspection jig 200a is divided into five portions in parallel with a horizontal direction (XY plane) of the fuel cell stack 100a, and the side surface 130a is divided into divided regions 131a, 132a, 133a, 134a, and 135a.

The inspection jig 200a is composed of substantially parallel extension portions extending from the bases of the respective divided regions, and adjacent extension portions constitute a divided inspection portion 240a.

A sensor 300a is arranged in an upper part of the inspection space of each divided inspection portion 240a.

Thus, in the present invention, the aspect of dividing the stacked end faces is not limited to a grid pattern, and for example, when a plurality of unit cells are stacked in a vertical direction (Z direction), the stacked end faces may be divided in a horizontal direction (XY plane).

When a leak is detected in the divided region, a specific leak position is identified by the second leak inspection step.

EXPLANATION OF REFERENCE NUMERALS 100 fuel cell stack
110 end plate
120 top surface
121, 122, 123, 124, 127 divided region
130 left side surface
140 right side surface
150 bottom surface
200 inspection jig
210 hole
220 bolt
230 frame
240 divided inspection portion
250 base
300 gas sensor

What is claimed is:

1. An inspection method for identifying a position of a gas leak from a fuel cell stack in which a plurality of fuel cell cells are stacked, the method comprising:
a jig installation step of installing an inspection jig that divides an outer surface, on which stacked end faces of the fuel cell stack are exposed, into a plurality of regions, the inspection jig including a divided inspection portion including a gas leak inspection space on each divided region, so that the inspection jig covers the outer surface of the fuel cell stack, the outer surface being a too surface of the fuel cell stack vertically above in a mounted state; and
a first leak inspection step of identifying a leak region, in which the gas leak occurs, with a gas sensor arranged in each of the gas leak inspection spaces,
wherein the divided inspection portion is formed in a pyramidal or a hemispherical shape, with a base of the divided inspection portion being coplanar with an outer periphery of the divided region, and the divided inspection portion narrowing in width as it extends from the base.

2. The method according to claim 1, wherein the divided regions of the outer surface are obtained by dividing the outer surface in a grid pattern or in parallel with a stacking plane.

3. The method according to claim 1, further comprising a second leak inspection step of identifying a leak position in the leak region identified in the first leak inspection step.

4. The method according to claim 1, wherein, after the inspection method is performed on a first outer surface of the fuel cell stack, the fuel cell stack is rotated so that a second outer surface comes to a position occupied by the first outer surface prior to rotation, and the inspection method is performed on the second outer surface.

5. The method according to claim 1, wherein the jig installation step comprises positioning the inspection jig on the fuel cell stack.

6. The method according to claim 1, wherein, in the jig installation step, the inspection jig is fixed to an end plate of the fuel cell stack and positioned.

7. The method according to claim 1, wherein the gas sensor is disposed in a top surface of the divided inspection portion.

* * * * *